United States Patent [19]
Swift et al.

[11] Patent Number: 6,164,073
[45] Date of Patent: Dec. 26, 2000

[54] METHOD AND APPARATUS FOR ADAPTING STEADY FLOW WITH CYCLIC THERMODYNAMICS

[75] Inventors: Gregory W. Swift, Santa Fe; Robert S. Reid, Los Alamos; William C. Ward, Santa Fe, all of N. Mex.

[73] Assignee: The Regents of the University of California, Los Alamos, N. Mex.

[21] Appl. No.: 09/215,749

[22] Filed: Dec. 18, 1998

Related U.S. Application Data

[60] Provisional application No. 60/085,846, May 18, 1998.

[51] Int. Cl.$^7$ ....................................................... F01K 1/00
[52] U.S. Cl. .............................................. 60/721; 60/517
[58] Field of Search .................... 60/721, 517; 62/467 R

[56] References Cited

U.S. PATENT DOCUMENTS

| | | |
|---|---|---|
| 3,339,635 | 9/1967 | Brandon . |
| 4,114,380 | 9/1978 | Ceperley .................................. 60/721 |
| 4,355,517 | 10/1982 | Ceperley .................................. 60/721 |

OTHER PUBLICATIONS

G. W. Swift, "Thermoacoustic Engines," J. Acoust. Soc. Am., pp. 1145–1180, (1998).
G. W. Swift, "Physics Today," No. 7, pp. 22–28, (1995).
J. A. Crunkleton, J. L. Smith, Jr., and Y. Iwasa, "High Pressure Ratio Cryocooler with Integral Expander and Heat Exchanger," Adv. Cryog. Eng., pp.—809–819, (1988).
Ben T. Zinn, "Pulsating Combustion," Advanced Combustion Methods, Academic Press, London, pp. 158–177, (1988).

Primary Examiner—Hoang Nguyen
Attorney, Agent, or Firm—Ray G. Wilson

[57] ABSTRACT

Energy transfer apparatus has a resonator for supporting standing acoustic waves at a selected frequency with a steady flow process fluid thermodynamic medium and a solid medium having heat capacity. The fluid medium and the solid medium are disposed within the resonator for thermal contact therebetween and for relative motion therebetween. The relative motion is produced by a first means for producing a steady velocity component and second means for producing an oscillating velocity component at the selected frequency and concomitant wavelength of the standing acoustic wave. The oscillating velocity and associated oscillating pressure component provide energy transfer between the steady flow process fluid and the solid medium as the steady flow process fluid moves through the resonator.

11 Claims, 8 Drawing Sheets

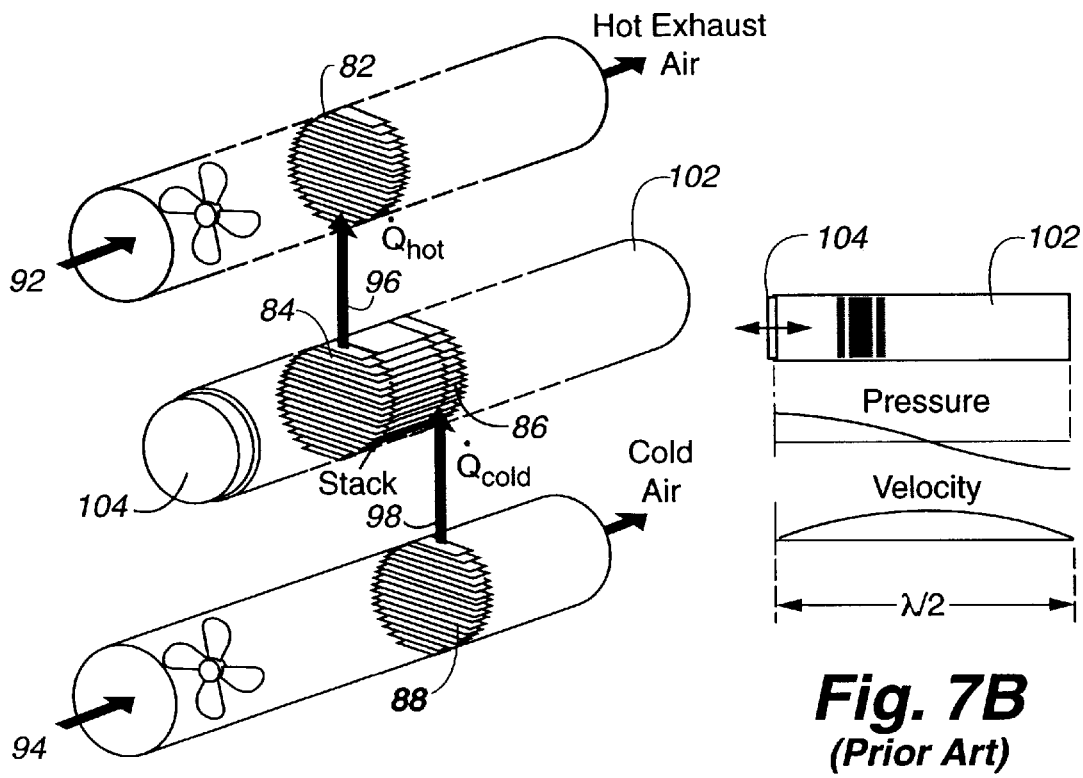
Fig. 7A (Prior Art)
Fig. 7B (Prior Art)
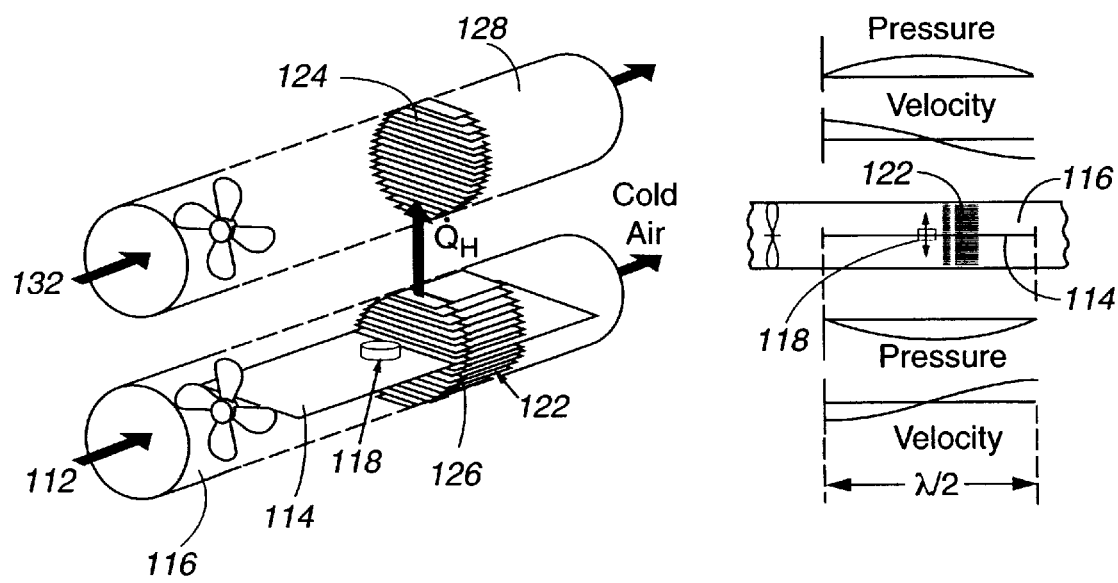
Fig. 8A
Fig. 8B

METHOD AND APPARATUS FOR ADAPTING STEADY FLOW WITH CYCLIC THERMODYNAMICS

RELATED CASES

This application claims the benefit of U.S. Provisional Application S. No. 60/085,846, Method and Apparatus for Adapting Steady flow with Cyclic Thermodynamics, filed May 18, 1998, and incorporated herein by reference.

This invention relates to thermodynamic devices and, more particularly, to thermodynamic devices using cyclic thermodynamics. This invention was made with government support under Contract No. W-7405-ENG-36 awarded by the U.S. Department of Energy. The government has certain rights in the invention.

FIELD OF THE INVENTION

Background of the Invention

Refrigerators, air conditioners, heat pumps, and engines in widespread use today rely on thermodynamic processes in fluids. Many systems (e.g., ramjets, some gas turbines, and internal combustion engines) are open, with each mass element of working fluid passing once through its sequence of changes in temperature, pressure, density, and entropy. Other systems (e.g., Rankine-cycle refrigerators and Stirling machines) are closed and cyclic, with each mass element of working fluid passing repeatedly through its sequence of thermodynamic steps. Examples of these conventional processes are illustrated schematically in FIGS. 1A (cyclic system) and 1B (open system). General approaches to their analysis are described in, e.g., van Wylen et al., *Fundamentals of Classical Thermodynamics* (Wiley, N.Y., 1965).

Cyclic thermodynamic systems suffer from a common shortcoming: at least two heat exchangers are needed to transfer heat between the thermodynamic working fluid (often a chlorofluorocarbon, steam, or helium) and a process fluid (usually air, combustion products, or water). Heat exchangers contribute to system inefficiency through temperature differences between these fluids and through viscous effects. This shortcoming is serious. For example, half the total irreversibility in home air conditioners and refrigerators occurs in the heat exchangers. Further, the decline of the Stirling engine from widespread use in the 19th century, and the rise of the Diesel and other internal combustion engines, occurred in large part because the latter engines need no combustion-temperature heat exchangers and reject much of their waste heat in their exhaust instead of through ambient-temperature heat exchangers.

Often, a process fluid must be cooled from a hot ambient temperature $T_H$ to a cold temperature $T_C$, these being the same two temperatures that the cyclic thermodynamic refrigerator spans. This situation illustrates a second fundamental shortcoming of a cyclic thermodynamic system: a substantial efficiency penalty from irreversible heat transfer between its cold heat exchanger at $T_C$ and the incoming process fluid at $T_H$. Even for an internally reversible cyclic refrigerator, cooling an isobaric ideal-gas stream with mass flow rate $\dot{m}$, the mechanical power needed is $$\dot{W}_{internally\ reversible} = \dot{m}c_p(T_H-T_C)^2/T_C \quad (1)$$

where $c_p$ is the isobaric heat capacity per unit mass. This expression is easily obtained as the product of the required cooling power $\dot{m}c_p(T_H-T_C)$ and the Carnot coefficient of performance $(T_H-T_C)/T_C$. This mechanical power is over twice the reversible mechanical power, which is the minimum required by the first and second laws of thermodynamics for this process:

$$\dot{W}_{reversible} = \dot{m}(h_C-h_H) - \dot{m}T_H(s_C-s_H) = \dot{m}c_p[T_C-T_H+T_H \ln(T_H/T_C)] \quad (2)$$

where h and s are enthalpy and entropy per unit mass. This expression is easily obtained as the difference between the incoming and outgoing flow availabilities.

These two shortcomings are addressed by the present invention, which combines a cyclic thermodynamic process with an externally applied steady flow of an open thermodynamic process, as illustrated schematically in FIG. 1C. Various objects, advantages and novel features of the invention will be set forth in part in the description which follows, and in part will become apparent to those skilled in the art upon examination of the following or may be learned by practice of the invention. The operation and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention includes energy transfer apparatus having a resonator for supporting standing acoustic waves at a selected frequency with a steady flow process fluid thermodynamic medium and a solid medium having heat capacity. The fluid medium and the solid medium are disposed within the resonator for imperfect thermal contact therebetween and for relative motion therebetween. The relative motion is produced by a first means for producing a steady velocity component and second means for producing an oscillating velocity component with the selected frequency of the standing acoustic wave. The oscillating velocity component and associated oscillating pressure provide energy transfer between the fluid medium and the solid medium as the fluid medium moves through the resonator.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 7A and 7B illustrate an air-conditioning system with conventional thermoacoustic refrigerator.

FIGS. 8A and 8B illustrate an air conditioning system with parallel-flow thermoacoustics.

DETAILED DESCRIPTION

Figure 1:
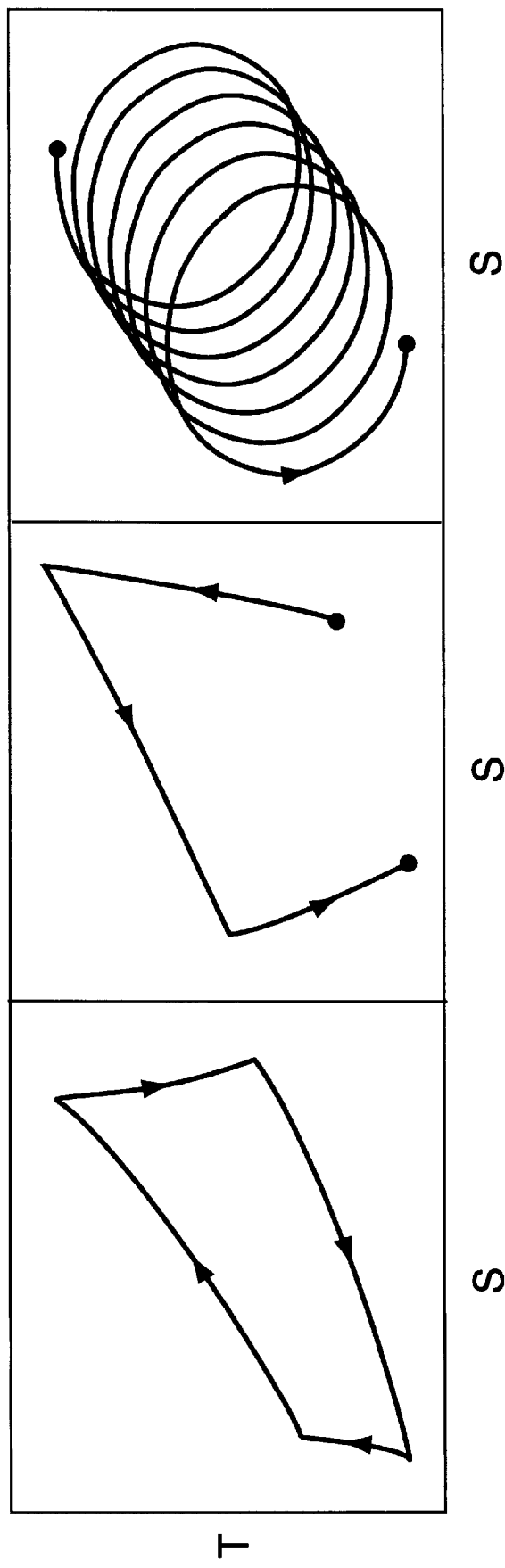
FIGS. 1A, 1B and 1C graphically depict thermodynamic cycles using a working fluid.

In accordance with the present invention, both of the shortcomings of conventional energy transfer apparatus related to heat exchangers and irreversible heat transfer conditions are simultaneously avoided. The process fluid itself is used as the cyclic thermodynamic working fluid by superimposing a steady flow on the oscillating flow needed for the thermodynamic cycle, as shown schematically in FIG. 1C. The closest known antecedents to this new concept are pulse combustion (B. T. Zinn, in *Advanced Combustion Methods,* edited by F. J. Weinberg, p. 113 (Academic Press, London, 1986) as applied to the V-1 buzz bomb of the Second World War and to modern residential gas furnaces, and the Boreas cryocooler (J. A. Crunkleton et al., 33 Adv. Cryog. Eng., p. 809 (1988)). However, the pulse combustor does not use its oscillating flow in any thermodynamic sense (only to pump air through the burner using check valves) and the Boreas cooler does not use its superposition of steady and oscillating flows to eliminate heat exchangers.

Figure 2:
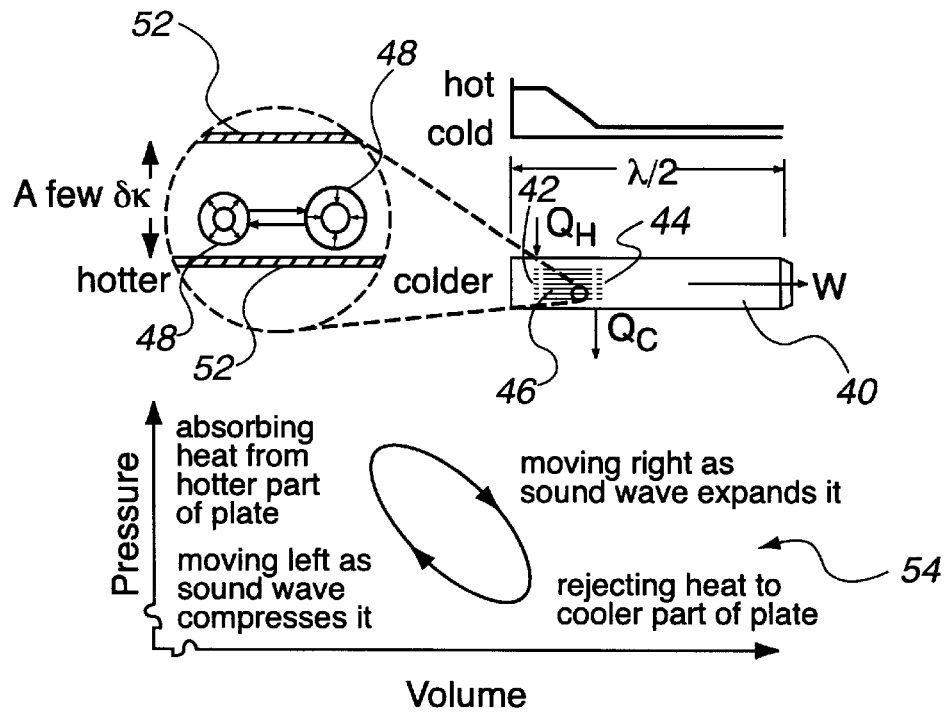
FIG. 2 schematically depicts a conventional thermoacoustic engine.

A thermoacoustic engine produces acoustic power while accepting heat from a high temperature heat source and delivering waste heat to a low temperature heat sink. FIG. 2 illustrates this process for a conventional thermoacoustic engine, through which the steady flow is zero. The body of the engine comprises resonator 40, containing a gas that can support an acoustic standing wave (here a half wavelength long). In resonator 40 are two heat exchangers 42, 44 drawing heat $\dot{Q}_H$ from the high temperature heat source and exhausting heat $\dot{Q}_C$ to the low temperature heat sink, respectively. Between the two heat exchangers 42, 44 is another heat exchange element 46 called a stack. When the axial temperature gradient in stack 46 is large enough, a standing acoustic wave appears in resonator 40.

The inset shows a magnified view of a typical parcel 48 of gas and its environs in stack 46 and illustrates the four step thermodynamic cycle that maintains the standing acoustic wave. The oscillating velocity of the standing acoustic wave carries parcel 48 back and forth, compressing and expanding it, with phasing such that it is at its most compressed state when at its farthest left position, and its most expanded state at its farthest right position. The presence of solid elements 52 with their steep temperature gradient in stack 46 adds an important new element to this simple acoustic oscillation: oscillating heat transfer between a gas parcel 48 and a nearest solid element 52.

Qualitatively, the adiabatic temperature oscillations that accompany the pressure oscillations can at first be ignored. When gas parcel 48 is at its leftmost position, heat flows from the relatively hot element 52 surface into gas parcel 48, expanding it; when gas parcel 48 is at its rightmost position, heat flows from it to the relatively cool surface of element 52, contracting gas parcel 48. Because the expansion takes place at the high pressure phase of the cycle and the contraction at the low pressure phase, parcel 48 does net work on its surroundings, as shown in the pressure-volume diagram 54 for parcel 48 at the bottom of FIG. 2. This net work, which is produced at the resonance frequency, maintains the resonance against parasitic losses and, in applications, provides an acoustic power output $\dot{W}$ to drive loads. The essential features of a thermoacoustic engine include nearly standing acoustic wave phasing between pressure and velocity (90°±5° is typical) and deliberately imperfect thermal contact between gas and solid elements (an inter-element spacing of 4 gas thermal penetration depths $\delta_\kappa$ is typical).

Figure 3:
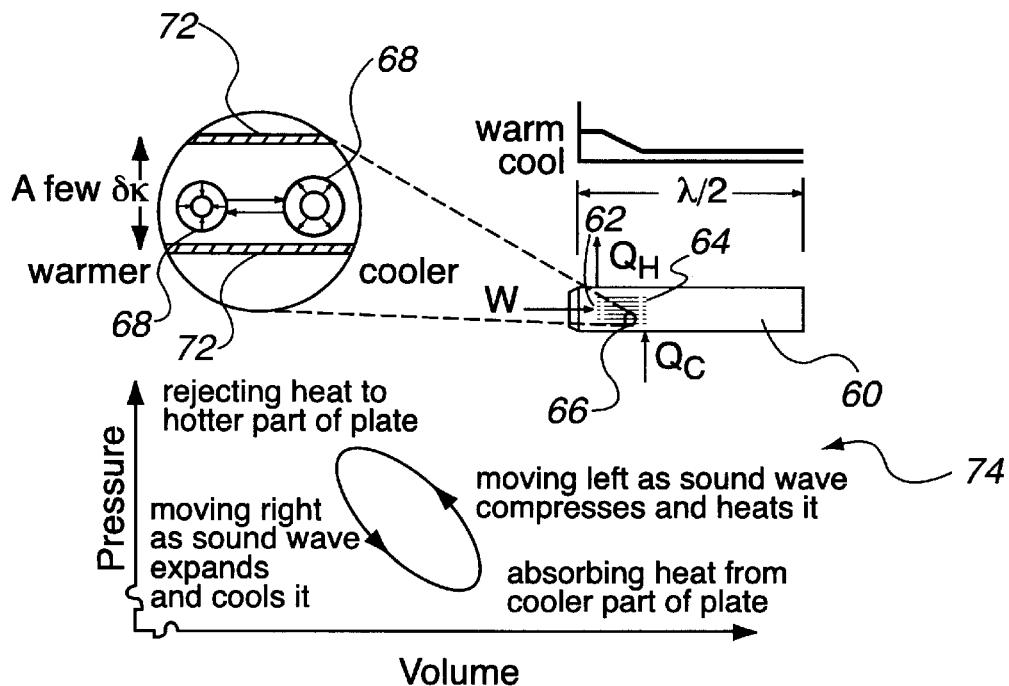
FIG. 3 schematically depicts a conventional thermoacoustic refrigerator.

Similarly, a thermoacoustic refrigerator (G. W. Swift, Thermoacoustic Engines, 84 *J. Acoust. Soc. Am.*, pp. 1145–1180 (1988), incorporated herein by reference) uses acoustic power to absorb heat from a low temperature source and deliver heat to a high temperature sink. The axial temperature gradient in the stack is weaker in a refrigerator than in an engine, so that the adiabatic temperature oscillation of the gas is more important. The thermodynamic cycle is illustrated in FIG. 3, where, as before, one parcel 68 of gas is shown as it oscillates. At its leftmost position, gas parcel 68 rejects heat to plate 72 in stack 66, because the temperature of gas parcel 68 was raised above the local stack temperature by adiabatic compression by the standing acoustic wave. Similarly, at its rightmost position gas parcel 68 absorbs heat from plate 72 in stack 66, because the temperature of parcel 68 is below the local stack temperature. Thus, each parcel 68 moves a little heat from right to left along plates 72 that form stack 66, up the temperature gradient, during each cycle of the sound wave. All the other parcels do the same thing, so that the overall effect, much as in a bucket brigade, is the net transport of heat from cold heat exchanger 64 to hot heat exchanger 62.

The above description is directed to prior-art thermoacoustic systems, for which the steady (i.e., time averaged) velocity component of the working fluid is zero. The present invention is directed to the thermodynamic superposition of steady flow and a cyclic process, with a simple example of such a system shown in FIG. 4, based on application to a thermoacoustic refrigerator (G.W. Swift, 48 Physics Today, No. 7, p. 22 (1995)). The system includes a toroidal resonator 10, filled with, e.g., a 92% helium, 8% argon mixture at a pressure of $P_o$=3.23 bars. Air at 1 bar has also been used successfully, but this particular gas mixture provides larger, more accurately measurable cooling power.

A resonator with at least two pressure nodes 16, 18, such as the full-wavelength resonator 10, is desirable in order to provide one pressure node, e.g., node 16 for injecting a steady velocity component in resonator 10 and a second pressure node, e.g., node 18 for removing the steady velocity component from resonator 10. A pressure node at each of locations 16 and 18 assures that no acoustic power is lost down the connecting tubes. In the experimental example, a 94-Hz fundamental resonance, with a full wavelength around torus 10, is driven by loudspeaker pairs 12, 14, with the loudspeaker pair 12 on one side of resonator 10 operating 180° out of phase from the loudspeaker pair 14 on the other side of resonator 10. Pressure nodes 16, 18 (marked "N") of the standing acoustic wave divide resonator 10 into symmetric halves. Pressure anti-nodes 22, 24 of the standing acoustic wave (marked "A") are located near loudspeaker pairs 12, 14 on each side.

Near each loudspeaker pair 12, 14 is a heat exchanger 26, 28, respectively, at room temperature (marked "H"), heat storage and transfer elements 32, 34 called stacks, and cold heat exchangers 36, 38 (marked "C"). In an exemplary design, each room temperature heat exchanger 26, 28 consists of copper fins soldered onto copper tubes, with the fins removing heat from the gas in the resonator. Each electrically heated cold heat exchanger 36, 38 consists of a grid of nichrome ribbons. Cold heat exchangers 36, 38 allow versatile measurements and control in these experiments, but they are completely unnecessary for cooling the gas itself.

Between room temperature heat exchangers 26, 28 and cold heat exchangers 36, 38 are stacks 32, 34, respectively.

Design considerations for stacks 32, 34 are generally discussed in, e.g., U.S. Pat. No. 4,489,553, issued Dec. 25, 1984, to Wheatley et al., and U.S. Pat. No. 4,858,441, issued Aug. 22,1989, to Wheatley et al. In an exemplary embodiment for the experimental results presented herein, stacks 32, 34 consist of parallel fiberglass plates with length 15.2 cm, much less than the wavelength of the sound wave. The separation between plates in the stack is 0.81 mm, maintained by straight lengths of epoxy-coated nylon monofilament, aligned along the length of the stack, and located on 13.5-mm centers. The separation between plates is several thermal penetration depths in the gas. The thermal penetration depth $\delta_\kappa = \sqrt{2\kappa/\omega\rho_o c_p}$ is roughly the distance heat diffuses in a time $2/\omega$, where $\kappa$ is the thermal diffusivity of the gas, $\rho_o$ is its density, $c_p$ is its isobaric heat capacity per unit mass, and $\omega$ is the angular frequency of the acoustic oscillation.

In a stack 32, 34, the oscillating gas displacements produced by the standing wave are a small fraction of the stack length. When the gas is displaced toward the pressure antinode, it is in its most compressed state and its temperature is higher than the adjacent plate temperature, so that heat is transferred from the gas to the plate. Conversely, when the gas is displaced toward the pressure node, its temperature is lower than that of the adjacent plate, so heat is transferred to the gas from the plate. The net effect of these processes is heat pumping toward the pressure antinode. In a prior-art thermoacoustic refrigerator, with no steady flow, this heat pumping is described approximately by the well known (Swift (1988), supra) second-order thermoacoustic power flux, $$\dot{H}_2 = Bp_1 U_1 (dT_o/dx - \nabla T_{crit}), \quad (3)$$

where B and $\nabla T_{crit}$ are treated here as constants that depend only on geometry and gas properties, and $dT_o/dx$ is the gradient of the stack temperature, with x along the direction of acoustic oscillation. The quantities $p_1$ and $U_1$ are, respectively, the amplitudes of the first order pressure and volumetric velocity oscillations in the stack; for simplicity here, they are assumed to be independent of x. When $dT_o/dx < \nabla T_{crit}$, acoustic power is absorbed from the standing acoustic wave by the stack and $\dot{H}_2$ flows from cold to hot, producing refrigeration. If the stack is well insulated, $\dot{H}_2$ is independent of x; then Equation (3) implies that the stack temperature is a linear function of x.

Figure 5:
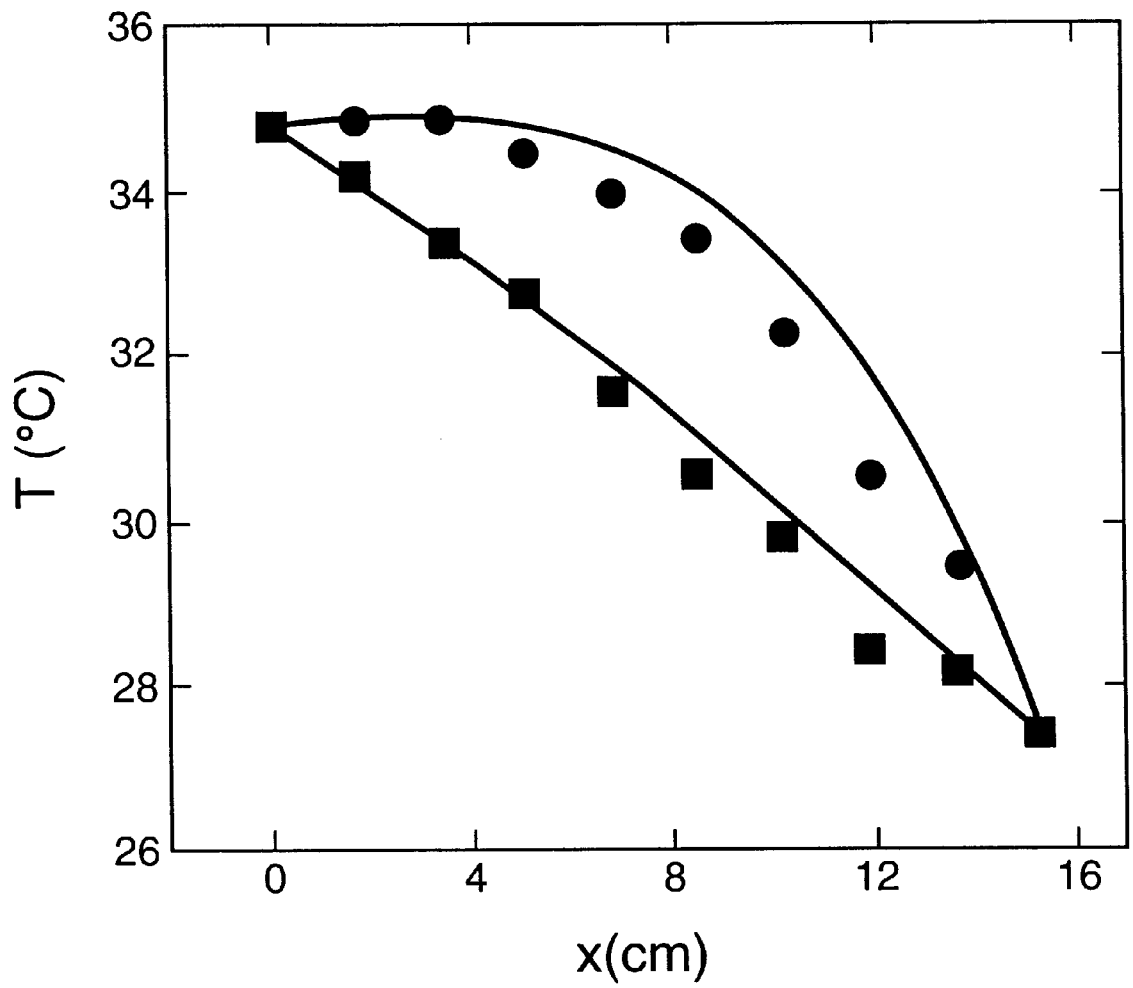
FIG. 5 graphically depicts stack temperature as a function of distance in the full wavelength refrigerator.

The squares in FIG. 5 display this type of (nearly) linear temperature profile for zero steady flow. The corresponding line is the result of a numerical calculation based on Rott's wave equation and energy flux equation (see, e.g., Swift (1988), supra), and has slight curvature because these equations include the small x dependences of B, $\nabla T_{crit}$, $P_1$, and $U_1$. These equations are based in part on the acoustic approximation, namely that all oscillating quantities are much smaller than their time-independent counterparts. This approximation is well satisfied for pressure in all these measurements, with $P_1/P_o = 0.0200$; however, it is not satisfied as well for gas displacement amplitude, which is of the order of 10% of the length of the stack.

Superimposing steady flow on this thermoacoustic refrigerator produces more useful behavior while adding little complexity to the hardware. For the configuration shown in FIG. 4, the steady flow enters the resonator 10 at the upper pressure node 16, flows past the pressure anti-nodes 22, 24 and through stacks 32, 34 from H to C, and exits resonator 10 at lower pressure node 18. The volumetric velocity $U_a$ of this steady flow was measured with an accuracy of typically 2% using a commercial laminar flowmeter (not shown in FIG. 4) located above upper pressure node 16 of resonator 10. Values of $U_a$ quoted here are half the value measured at the flowmeter, corresponding to the flow through one stack. The applied volumetric flow velocity is superimposed on the much larger oscillating volumetric flow velocity of the standing acoustic wave. Thus, the steady flow is cooled from $T_H$ to $T_C$ directly, without heat transfer across a heat exchanger at $T_C$. This illustrates the elimination of the first shortcoming noted above.

Sensible heat is extracted from the steady flow at a rate $\dot{Q}_a = \rho_o c_p U_a (T_H - T_C)$. A useful dimensionless group describing the effect of steady flow on the stack temperature distribution is the ratio of $\dot{Q}_a$ to the second-order thermoacoustic power flux given in Equation (3):

$$\Xi = \frac{\rho_o c_p U_a (T_H - T_C)}{B p_1 U_1 (dT_o/dx - \nabla T_{crit})}. \quad (4)$$

In this situation, the independence of total power flux on x implies $$\frac{d}{dx}\left[\rho_o c_p U_a T_o(x) + B p_1 U_1 \left(\frac{dT_o}{dx} - \nabla T_{crit}\right)\right] \cong 0 \quad (5)$$

so that $T_o$ is approximately exponential instead of linear, with characteristic length proportional to $1/\Xi$.

The circles in FIG. 5 show measured temperatures with $U_a = 5.2 \times 10^{-3}$ m/s, corresponding to $\Xi \cong 5$. Values of $p_1/p_o$, $T_H$, and $T_C$ were the same as for the $U_a = 0$ data shown by the squares; this was accomplished by adjustment of loudspeaker power, water flow at $T_H$, and most importantly the power $\dot{Q}_c$ supplied at the cold heat exchanger. The qualitatively exponential curvature expected from Equation (5) is evident in the measurements. The curve in FIG. 5 associated with the circles shows the result of a calculation based on Rott's wave and energy-flux equations, augmented by the additional term shown in Equation (5) due to the sensible heat load imposed throughout the stack by the steady flow.

Figure 6:
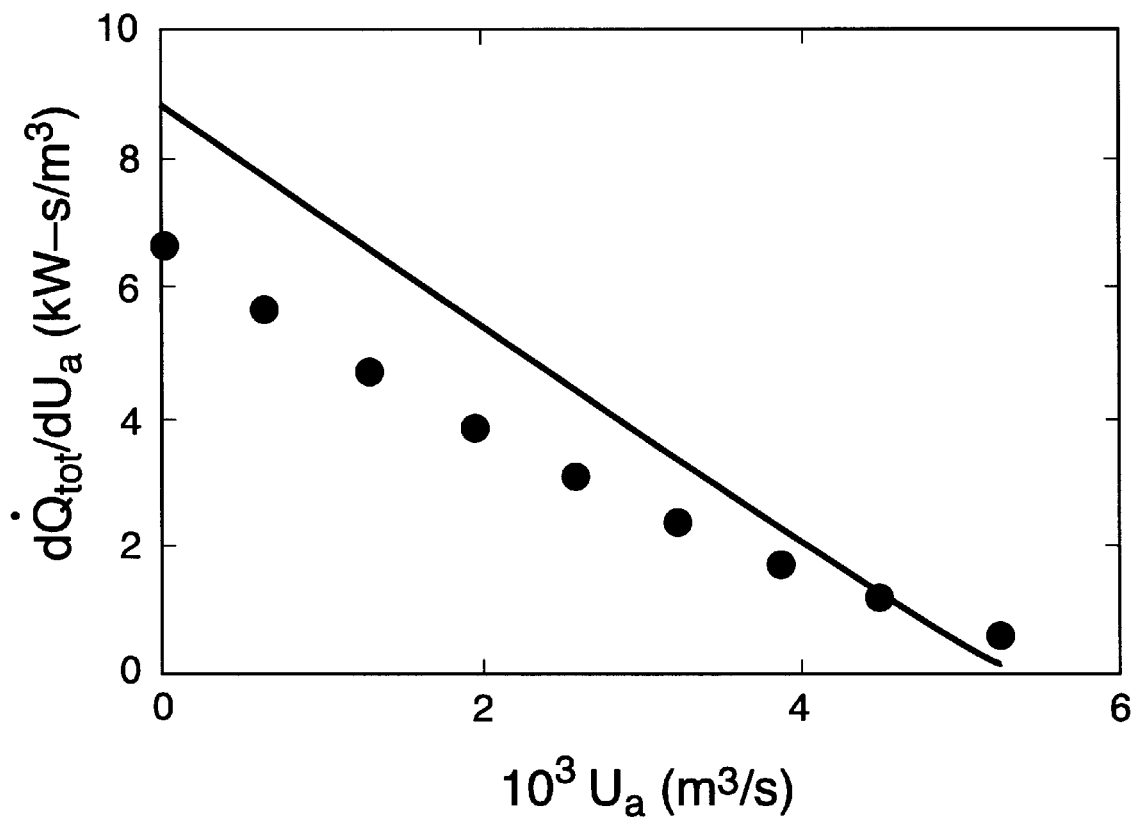
FIG. 6 graphically depicts the rate of increase of total refrigeration power with steady flow.

As $U_a$ was increased, distorting $T_o(x)$ from near linear to an increasingly curved profile, it was necessary to reduce $\dot{Q}_C$ to maintain $T_H - T_C$ constant. The details of this trade-off, between the electric heat load at $T = T_C$ and the distributed heat load at $T_H > T > T_C$ imposed by the flowing gas, illustrate the elimination of the second shortcoming noted above: the total cooling power $\dot{Q}_{tot} = \dot{Q}_a + \dot{Q}_C$ rose as $U_a$ was increased, while the acoustic power needed to drive the refrigerator remained constant. This is illustrated in FIG. 6, which displays $d\dot{Q}_{tot}/dU_a$ vs. $U_a$. The circles show experimental values obtained from measurements of $\dot{Q}_{tot}$ at nine values of $U_a$. These positive values of $d\dot{Q}_{tot}/dU_a$ clearly demonstrate the system's increased ability to pump heat as the temperature at which the total heat load is applied shifts from $T_C$ to a continuum of temperatures $\geq T_C$. The increase in $\dot{Q}_{tot}$ as $U_a$ increases from 0 to $4 \times 10^{31}$ $^3$ m$^3$/s corresponds to a 15% increase in $\dot{Q}_{tot}$ while the acoustic power provided by the loudspeakers remained essentially constant. As in FIG. 5, the lines in FIG. 6 are calculated results based on Rott's equations augmented by the additional applied-flow term shown in Equation (5). The calculations and measurements are in reasonable agreement.

Some of the disagreement between calculated and measured temperatures shown in FIG. 5 is apparently due to thermometer errors common to both data sets. The remaining disagreements in FIGS. 5 and 6 may be due to imperfect hardware construction. The data shown here were for the "right" stack (i.e., stack 34 shown in FIG. 4). The differences between measured temperature profiles in the "right" and "left" stacks, typically 0.5° C. in mid-stack, and the corresponding observed differences in measured $\dot{Q}_C$, typically 10 W out of a total cooling power per stack of 100 W, are suggestive of such construction imperfections. Alternatively, some of the disagreement between calculations and measurements here may be due to violation of the calculations' assumption that the gas displacement amplitude is much smaller than the stack length.

Figure 4:
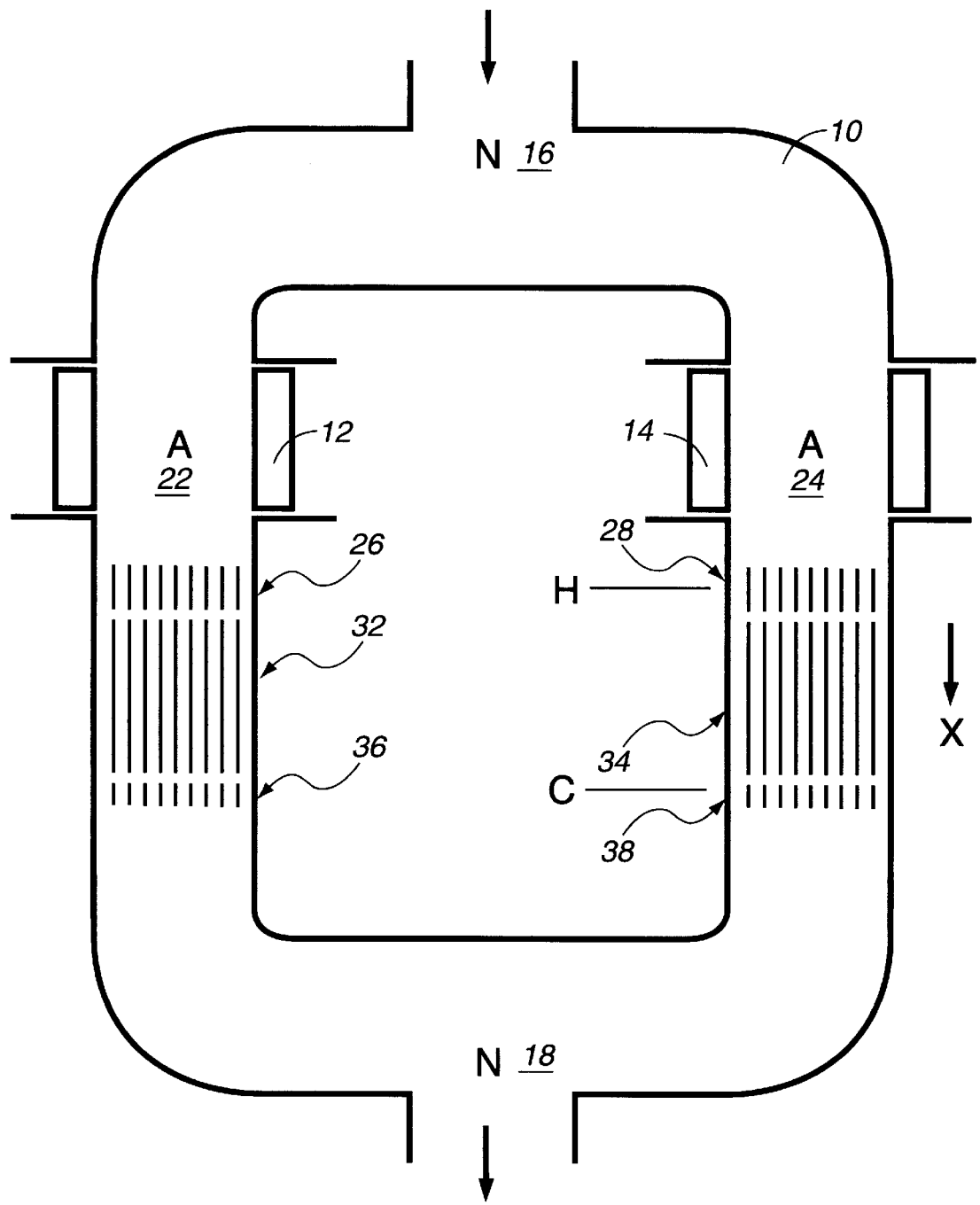
FIG. 4 is a schematic of a full wavelength thermoacoustic refrigerator with an externally applied steady flow.

The apparatus of FIG. 4 was also operated with the steady flow reversed, i.e., with the steady flow entering resonator 10 at lower node 18 and exiting resonator 10 at upper node 16. This demonstrated another mode of operation of the invention, in which the process stream was heated instead of cooled by the thermoacoustic phenomena.

The present invention is not the only way to shift some of the total heat load of a refrigerated process stream from $T_C$ to temperatures greater than $T_C$. Two or more refrigerators in series with respect to the process stream are often used to remove some of the heat load at a higher temperature. In a thermoacoustic refrigerator, one could also imagine a hybrid stack or heat exchanger with the process fluid flowing steadily down the temperature gradient while a separate thermoacoustic gas pumps heat up the temperature gradient. Unfortunately, the heat exchangers in such schemes add cost and thermodynamic loss. The superposition of the steady process flow and the oscillating flow of the thermoacoustic cycles, using a single gas, achieves similar results without additional heat exchangers.

Cyclic thermodynamics with steady flow is generally applicable to energy transfer apparatus and is as applicable to engines as to refrigerators. As taught by Ceperley in U.S. Pat. No. 4,114,380, issued Sep. 19, 1978, and U.S. Pat. No. 4,355,517, issued Oct. 26, 1982, Stirling-cycle engines and refrigerators can also be achieved with acoustic apparatus without steady flow, so the present invention also shows that cyclic thermodynamics with a steady flow can be used with Stirling and Rankine cycles as well as with the Brayton-like thermoacoustic cycle described here. This development should lead to new energy-conversion and refrigeration technologies with reasonable efficiencies and costs. A wide variety of energy-conversion applications appear suitable; representative among these are heat-driven refrigeration, dehumidification of gas streams, distillation, and cryogen liquefaction.

As a point of departure, FIGS. 7A and 7B show the main parts of an air conditioning system using prior-art thermoacoustic refrigeration. Four heat exchangers 82, 84, 86, 88 are required: two 84, 86 in the working fluid and one 82, 88 in each of the two air streams 92, 94, respectively. Heat transfer between working fluid heat exchangers 84, 86 and air heat exchangers 82, 88, indicated by arrows, is accomplished via heat transfer conduits 96, 98 (pumped water loops, heat pipes, thermosyphons, or the like). The four heat exchangers 82, 84, 86, 88 and two heat transfer conduits 96, 98 account for most of the capital cost of the system.

Acoustic power is supplied to resonator 102 with acoustic driver 104, as shown in FIG. 7A. FIG. 7B depicts the conventional standing acoustic wave oscillating pressure and oscillating velocity relationship along standing acoustic wave resonator 102.

The simpler air conditioning system shown in FIGS. 8A and 8B illustrates one aspect of the present invention: the use of process fluid as working fluid with nonzero steady velocity component parallel to the oscillating velocity. A midwall 114 in indoor air duct 116 separates two acoustic resonators, driven 180° out of phase from each other by an oscillating piston 118 in the center of midwall 114. The drive frequency is chosen to make the acoustic wavelength equal to twice the length of midwall 114, so there will be pressure nodes at the ends of midwall 114 and negligible acoustic power is radiated to distant parts of duct 116. The position of stack 122 relative to the nodal pattern of the standing acoustic wave is chosen so that conventional thermoacoustic processes as described in FIG. 3 above pump heat from right to left. FIG. 8B depicts the pressure/velocity relationships along the two sides of midwall 114. With the addition of nonzero steady velocity component, the gas moves through the system in a repetitive, "50 steps forward, 49 steps back" manner, in position, in temperature, and in density and entropy, delivering cold air out of the right end of duct 116.

Figures 9A, 9B:
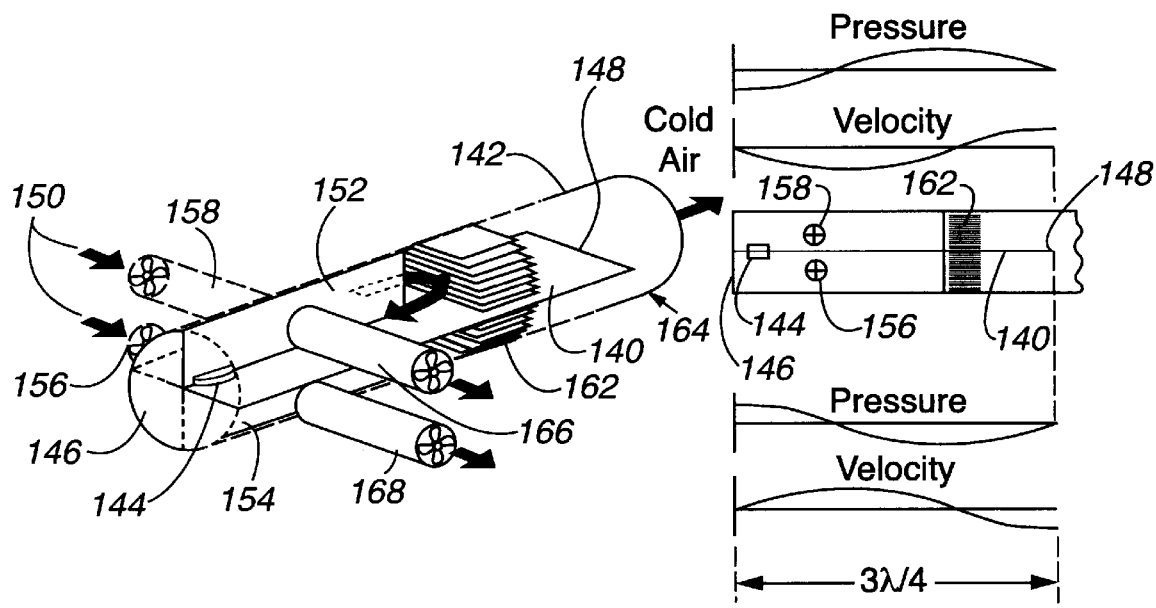
FIGS. 9A and 9B illustrate an air conditioning system with both perpendicular-flow thermoacoustics and parallel-flow thermoacoustics.

A system with steady flow parallel with the oscillating flow was discussed above. To introduce a second aspect of the invention, apparatus with a steady flow that is perpendicular to the oscillating flow, referring again to the air-conditioner motif, is shown in FIG. 9A and 9B with the elimination of all heat exchangers from a thermoacoustic system. As in FIG. 8A, midwall 140 separates duct 142 into two regions that resonate 180° out of phase from each other. The frequency of driver 144 is chosen so that ¾ of the acoustic wavelength equals the length of midwall 140. Then, a pressure antnode occurs at the hard duct closure 146 of midwall 140, and a pressure node occurs at open end 148 of midwall 140.

Deflector walls 152, 154 further divide each of the two resonators formed by midwall 140 in order to direct the steady flow of the air. A steady flow of air 150 is introduced into the resonator at the pressure node one quarter of a wavelength from hard closure 146, so that negligible acoustic power is radiated into the air inlet ducts 156, 158 and air outlet ducts 166, 168. A significant fraction of the steady air flow 150 passes through stack 162, is thereby cooled and dehumidified, and leaves the right end 164 of duct 142. Most of the steady flow passes vigorously past the hot end of stack 162, moving perpendicular to the oscillating flow along the end of stack 162, in order to remove the waste heat from the thermoacoustic system and exhaust it. A "stirring fan" (not shown) within duct 142 could be included to vigorously stir the gas near the hot end of stack 162, so the open-flow gas will be delivered and removed in an essentially spatially uniform manner at the stack end when the stirring fan is operated.

As discussed herein "superimposed flow" includes both embodiments (parallel and perpendicular process air flows) of the present invention.

It should be noted that all of the above discussion applies to heat pumps as well as refrigerators; and, as used herein, the term "refrigerator" includes heat pumps. In addition, all of the above discussion applies to engines. As one example of an application to engines, perpendicular flow of ambient-temperature air at the cold end of a thermoacoustic engine stack can remove the waste heat from the engine, eliminating the need for a cold heat exchanger. As a second example, parallel flow of hot combustible gas through a thermoacoustic engine stack from the hot end to the cold end can deliver heat to the stack, eliminating the need for a hot heat exchanger.

Some applications will involve working fluids that are more complicated than an ideal gas. For example, dehumidification drying will involve humid air and fog; open combustion powered engines will involve chemical reactions in the air.

The air conditioner described above will, incidentally, dehumidify the air, returning cold dry air. But for many important drying applications, it is desired to dehumidify air and return it warm and dry. Hence, embodiments that comprise coolers and heat pumps in the same resonator may also be considered to put the waste heat from the hot end of the cooling stack back into the air stream. This is but one of many embodiments for open thermoacoustic systems in which multiple stacks, serving multiple functions, share a resonator.

Figure 10:
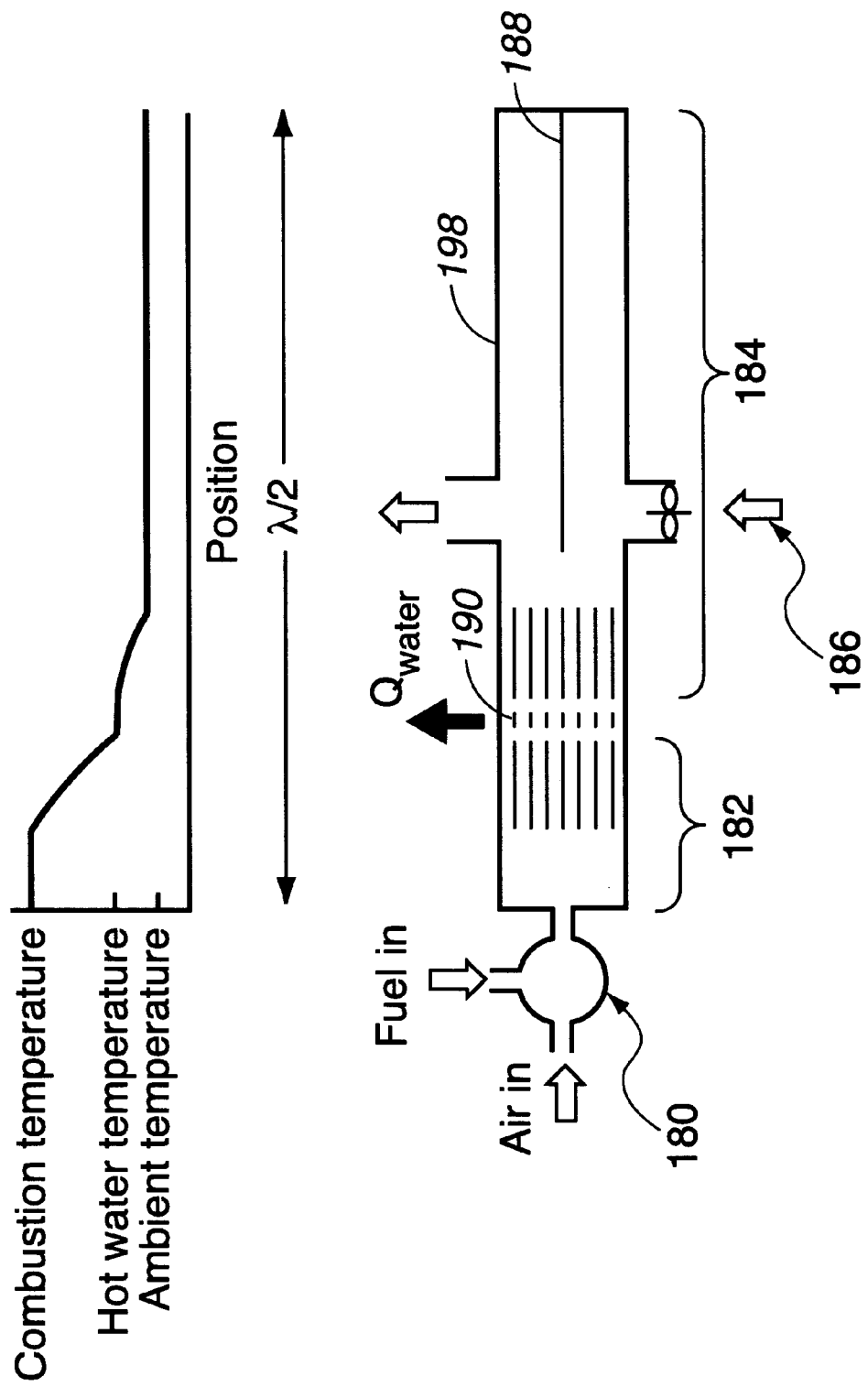
FIG. 10 illustrates a heat-driven heat-pump water heater.

As another example, industry has long desired a combustion-powered heat pump hot water heater that would have a (first-law) efficiency greater than 100%. Part of the heat of combustion would drive a engine, which would drive a heat pump to draw heat from ambient air and deliver it to the hot water. Such devices can (and have) been built with existing technology, but only at a cost that is prohibitive. Such a system can be designed using open-flow thermoacoustics as shown in FIG. 10. Both thermoacoustic engine 182 and thermoacoustic heat pump 184 deliver heat to hot water passing through heat exchanger 190. Acoustic power to maintain the half-wavelength standing acoustic wave in resonator 198 and to drive thermoacoustic heat pump 184 is produced in part by thermoacoustic engine 182 and in part by pulse combustor 180. Steady-flow air stream 186 supplies heat to heat pump 184 at ambient temperature as it passes close to heat pump 184 due to midwall 188. This system incorporates the synthesis of many of the embodiments of this invention: ideal gas behavior; latent heat features (as the water vapor produced in the combustion is condensed); in-stream combustion; and both parallel and perpendicular-flow heat exchange.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Energy transfer apparatus comprising:
   a cavity resonator for supporting fluid oscillations at a selected frequency;
   a steady flow process fluid thermodynamic medium and a solid medium having heat capacity, where said fluid medium and said solid medium are disposed within said cavity resonator for thermal contact therebetween and for relative motion therebetween; and
   means for producing said relative motion, including first means for producing a steady velocity component and second means for producing an oscillating velocity component and associated oscillating pressure at said frequency of said fluid oscillations,
   wherein said oscillating velocity component and associated oscillating pressure provide energy transfer between said steady flow process fluid and said solid medium as said steady flow process fluid moves through said cavity.

2. Energy transfer apparatus according to claim 1, wherein said apparatus is an engine and said open process fluid delivers energy to said solid medium to produce said fluid oscillations for producing said oscillating velocity component and producing acoustic energy.

3. Energy transfer apparatus according to claim 1, wherein said apparatus is a refrigerator and said means for producing said oscillating velocity component generates a temperature differential along said solid medium that is effective to change the temperature of said steady flow process fluid.

4. Energy transfer apparatus according to any one of claims 2 or 3, wherein said cavity resonator comprises two parallel cavities operating 180° out of phase.

5. Energy transfer apparatus according to claim 4, wherein said parallel cavities are connected to form a toroidal structure.

6. Energy transfer apparatus according to claim 4, where said parallel cavities are formed in a single resonator tube with a mid wall along a diameter of said tube to separate said tube into said parallel cavities.

7. Energy transfer apparatus according to claim 4, further including input connections for said steady flow process fluid medium to said parallel cavities that are perpendicular to said oscillating velocity component within said cavities and located at a pressure node within said cavities.

8. Energy transfer apparatus according to claim 1 further including a heat exchanger at one end of said solid medium.

9. Energy transfer apparatus according to claim 1, wherein said steady velocity component and said oscillating velocity component are parallel within a few thermal penetration depths $\delta_\kappa$ of said solid medium.

10. Energy transfer apparatus according to claim 1, wherein said steady velocity component and said oscillating velocity component are perpendicular at an end of said solid medium.

11. Energy transfer apparatus according to claim 1, wherein said apparatus is a heat pump further including:
    said cavity resonator with a mid wall along a diameter of said cavity resonator to separate said cavity into parallel cavities;
    a pulse combustor in combination with a thermoacoustic engine for producing said oscillations at said selected frequency in said cavity resonator;
    input and output openings in said cavity resonator for passing said steady flow process fluid thermodynamic medium along one end of said mid wall and adjacent said solid medium for transferring heat to said solid medium and cooling said steady flow process fluid thermodynamic medium; and
    a heat exchanger for transferring heat from said thermoacoustic engine and from said solid medium receiving heat from said steady flow process fluid thermodynamic medium for use outside said heat pump.

* * * * *